United States Patent
Dutra et al.

(10) Patent No.: US 7,426,583 B1
(45) Date of Patent: Sep. 16, 2008

(54) METHOD AND CIRCUIT FOR DECODING AN ADDRESS OF AN ADDRESS SPACE

(75) Inventors: Paulo L. Dutra, San Jose, CA (US); Jorge Ernesto Carrillo, San Jose, CA (US); Goran Bilski, Molndal (SE)

(73) Assignee: XILINX, Inc., San Jose, CA (US)

( * ) Notice: Subject to any disclaimer, the term of this patent is extended or adjusted under 35 U.S.C. 154(b) by 352 days.

(21) Appl. No.: 11/238,431

(22) Filed: Sep. 28, 2005

(51) Int. Cl.
*G06F 3/00* (2006.01)
*G06F 13/00* (2006.01)
*G06F 5/00* (2006.01)

(52) U.S. Cl. .................... 710/3; 710/9; 710/32; 710/40
(58) Field of Classification Search ...................... 710/3
See application file for complete search history.

(56) References Cited

U.S. PATENT DOCUMENTS 6,173,383 B1 * 1/2001 Casamatta .................. 711/202
6,295,579 B1 * 9/2001 Sukegawa et al. ........... 711/119
2004/0044806 A1 * 3/2004 Moll et al. ...................... 710/3

* cited by examiner

Primary Examiner—Henry Tsai
Assistant Examiner—Kris Rhu
(74) Attorney, Agent, or Firm—LeRoy D. Maunu

(57) ABSTRACT

Decoding an address in an address space including a plurality of local ranges and a plurality of peripheral ranges is described. Various approaches for decoding an input address include determining decoder address bits of the address space that distinguish local ranges from each other and that distinguish local ranges from peripheral ranges. The local and peripheral ranges are interleaved and have a plurality of sizes. The number of decoder address bits is less than the number of address bits in the address space and less than the number of local ranges plus the number of peripheral ranges. Using the decoder address bits of an input address, it is determined whether the input address is within a portion of the address space that includes one of the local ranges and does not include any of the peripheral ranges nor the local ranges other than the one of the local ranges.

14 Claims, 7 Drawing Sheets

METHOD AND CIRCUIT FOR DECODING AN ADDRESS OF AN ADDRESS SPACE

FIELD OF THE INVENTION

The present invention generally relates to computer architecture, and more particularly to decoding an address space of an embedded processor system on configurable hardware.

BACKGROUND

A processor of a computing system may access a data element by issuing a transaction, such as a memory read transaction or a memory write transaction, on a bus of the computing system. The transaction may include an identifier of the type of transaction and an address identifying the data element accessed by the transaction. The address of a transaction issued on the bus may have a width in address bits that is dependent on the implementation of the bus. The width, N, of the address may define an address space that has $2^N$ data elements.

The address space may be divided into various ranges. For example, the computing system may include several local devices and a respective range may be allocated to each local device. In addition, the computing system may include several peripheral devices and another respective range of the address space may be allocated to each peripheral device. An address decoder may receive the address of a transaction from the processor and the address decoder may determine whether a local range includes the address. Expeditious handling of a transaction by the computing system may require that the address decoder quickly determine whether a local range includes the address.

Quick address decoding may be provided for a computing system by using one address bit to split the address space between the local devices and the peripheral devices. For example, a value of zero for the most significant bit of an address may indicate that access to the corresponding data element for the address is provided by a local device and a value of one for the most significant bit of an address may indicate that access to the corresponding data element is provided by a peripheral device. Thus, the address space is split into a lower half allocated to local devices and an upper half allocated to peripheral devices.

Many applications for a computing system require complex allocations of the address space to various local and peripheral devices. Flexible allocation of an address space, including complex allocations of the address space, may be desirable in many other applications. An example complex allocation of the address space interleaves a local range between two peripheral ranges. A computing system with a complex allocation of the address space may require quick address decoding. However, distinguishing between local and peripheral ranges using a single bit may not be feasible for these complex allocations of the address space.

The present invention may address one or more of the above issues.

SUMMARY OF THE INVENTION

The various embodiments of the invention provide a variety of approaches for decoding an address in an address space including a plurality of local ranges and a plurality of peripheral ranges. The various approaches for decoding an input address include determining decoder address bits of the address space that distinguish the local ranges from each other and that distinguish the local ranges from the peripheral ranges. The local and peripheral ranges may be interleaved and may have a plurality of sizes. The number of the decoder address bits is less than a number of address bits in the address space and less than the number of local ranges plus the number of peripheral ranges. Using the decoder address bits of an input address, it is determined whether the input address is within a portion of the address space that includes one of the local ranges and does not include any of the peripheral ranges nor any of the local ranges other than the one of the local ranges.

In various other embodiments, an address decoder is provided for decoding an input address in an address space. The address space includes a plurality of peripheral ranges and a plurality of local ranges including a first local range. The address decoder includes a plurality of match circuits, and each match circuit receives a respective subset of address bits of the input address. Each match circuit indicates on an output control signal whether the subset of address bits of the input address matches a respective value for the first local range. A total of the number of the address bits in all of the subsets is less than the number of the local ranges plus the number of peripheral ranges. A carry chain may be coupled to the match circuits and generates an indicator that indicates whether the input address is in a portion of the address space that includes the first local range and does not include any of the peripheral ranges nor any of the local ranges other than the first local range. The carry chain may include a plurality of carry elements that are responsive to the control signals output from the match circuits.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
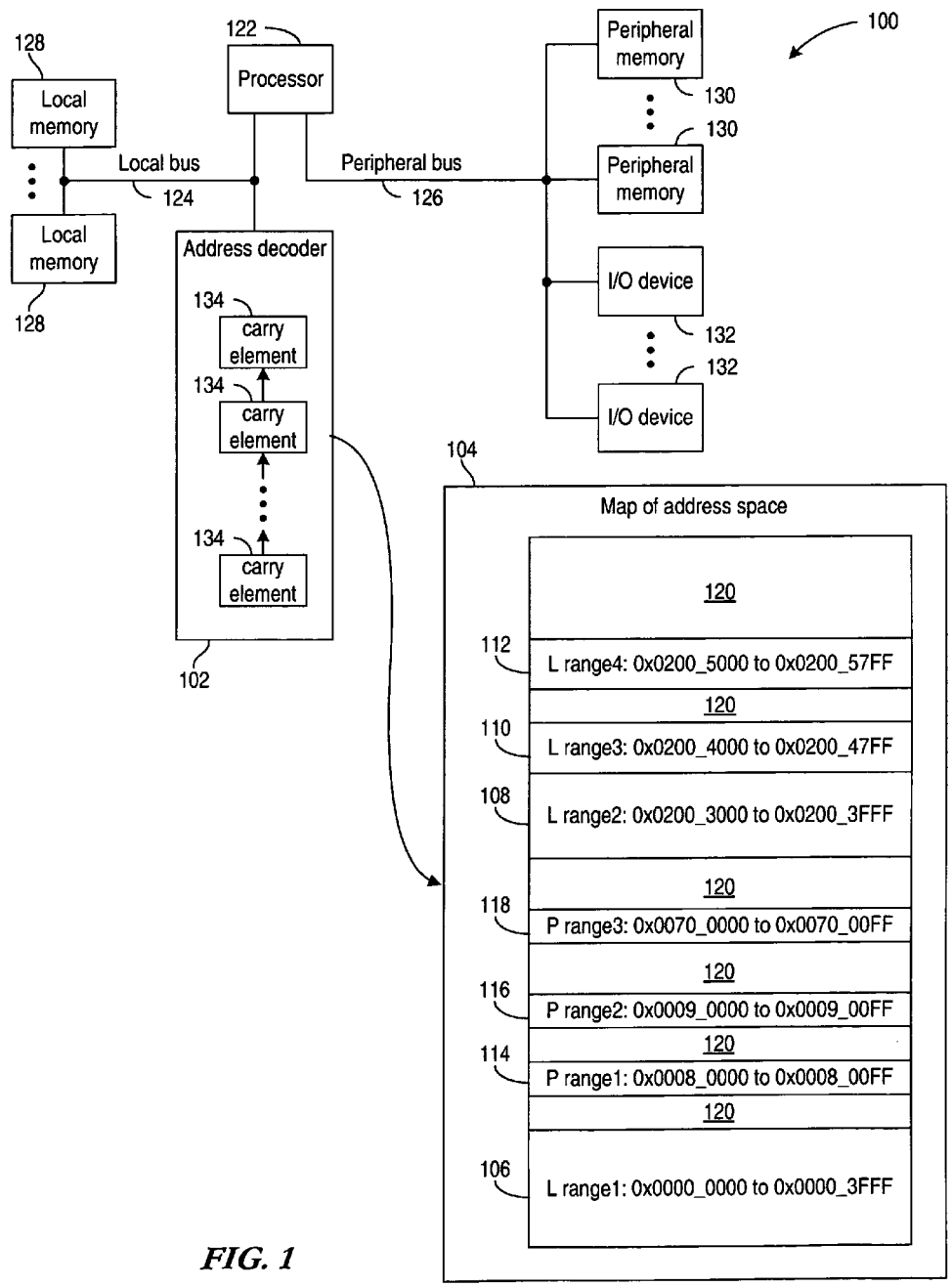
FIG. 1 is a block diagram of a computer system having an address decoder for an example address space in accordance with various embodiments of the invention.

FIG. 1 is a block diagram of a computer system having an address decoder 102 for an example address space in accordance with various embodiments of the invention. The example address space is allocated, as shown by map 104, into various ranges, including local ranges 106, 108, 110, 112 and peripheral ranges 114, 116, and 118. The address space also includes unallocated regions 120. Each range 106 through 118 in the address space may have a size that is a power of two and the starting address for the range may also be aligned to that power of two. The address decoder 102 may decode an address from processor 122 according to the map 104 of the address space.

In one embodiment, the computer system 100 includes a processor 122 that has a local bus 124 and a peripheral bus 126. The local bus 124 may provide low-latency access to local devices, such as local memories 128 and low-latency input/output (I/O) devices (not shown). The peripheral bus 126 may provide access to peripheral devices, such as peripheral memories 130 and I/O devices 132, which may have high access latency. The dedicated local bus 124 for local devices may prevent the possibly high access latency of peripheral devices from impacting the performance of accesses to local devices. An example processor 122 is the MicroBlaze processor available from Xilinx, Inc. of San Jose, Calif. The MicroBlaze processor has a local bus 124 denoted the Local Memory Bus and a peripheral bus 126 denoted the On-Chip Peripheral Bus.

Local bus 124 may provide access to data elements in local ranges 106, 108, 110, and 112 and peripheral bus 126 may provide access to data elements in peripheral ranges 114, 116, and 118. A transaction from processor 122 with an address in local range 106 may access a data element in a particular one of local memories 128. Similarly, a transaction from processor 122 with an address in one of local ranges 108, 110, and 112 may access a data element in a corresponding one of the local memories 128. A transaction from processor 122 with an address in one of peripheral ranges 114, 116, and 118 may access a data element in a corresponding one of peripheral devices 130 and 132. A transaction from processor 122 to an unallocated region 120 may indicate an improper access by the processor 122.

In certain embodiments, the processor 122 may issue a transaction accessing a data element onto both local bus 124 and peripheral bus 126, regardless of the address of the transaction. The transaction may be issued simultaneously onto both local bus 124 and peripheral bus 126 in one embodiment, to permit initial processing of the transaction in parallel by the local memories 128, peripheral memories 130, and I/O devices 132. The address decoder 102 may decode the address of the transaction and identify transactions with an address in local ranges 106, 108, 110, and 112. To support low-latency access to data elements in local memories 128, the address decoder 102 may need to identify transactions with an address in local ranges 106, 108, 110, and 112 is a short time period, such as within one clock cycle of a clock for the computer system 100. For a transaction with an address in one of the local ranges 106, 108, 110, and 112, the address decoder 102 may provide an acknowledge signal to the processor 122 along with the access to the data element being provided by the appropriate one of local memories 128. In one embodiment, the acknowledge signal also aborts further processing of the transaction by peripheral devices 130 and 132.

In another embodiment, each local device, such as local memories 128, has a respective version of the address decoder 102. For a read transaction, each of local memories 128 may read an internal data element using a portion of the address of the read transaction in parallel with the respective version of the address decoder 102 checking whether the address is within the local range for the local memory. One of the data elements is selected and returned to processor 122 based on an asserted acknowledge signal from one of the versions of the address decoder 102. In one embodiment, one local memory returns the value of the selected data element and the other local memories 128 return a value of zero, and the processor 122 receives a bit-wise OR of the values from each of the local memories 128. In addition, the processor 122 receives an OR of the acknowledge signals from each of the versions of address decoder 102. The OR of the acknowledge signals indicates that the received data value from the bit-wise OR is valid on the local bus 124. For a write transaction, the acknowledge signal from each version of the address decoder 102 may be used as a write enable for the corresponding one of the local memories 128.

The address decoder 102 may use a carry chain including a chain of carry elements 134 to quickly identify the destination for a transaction from the address of the transaction as is later discussed in detail.

Figure 2:
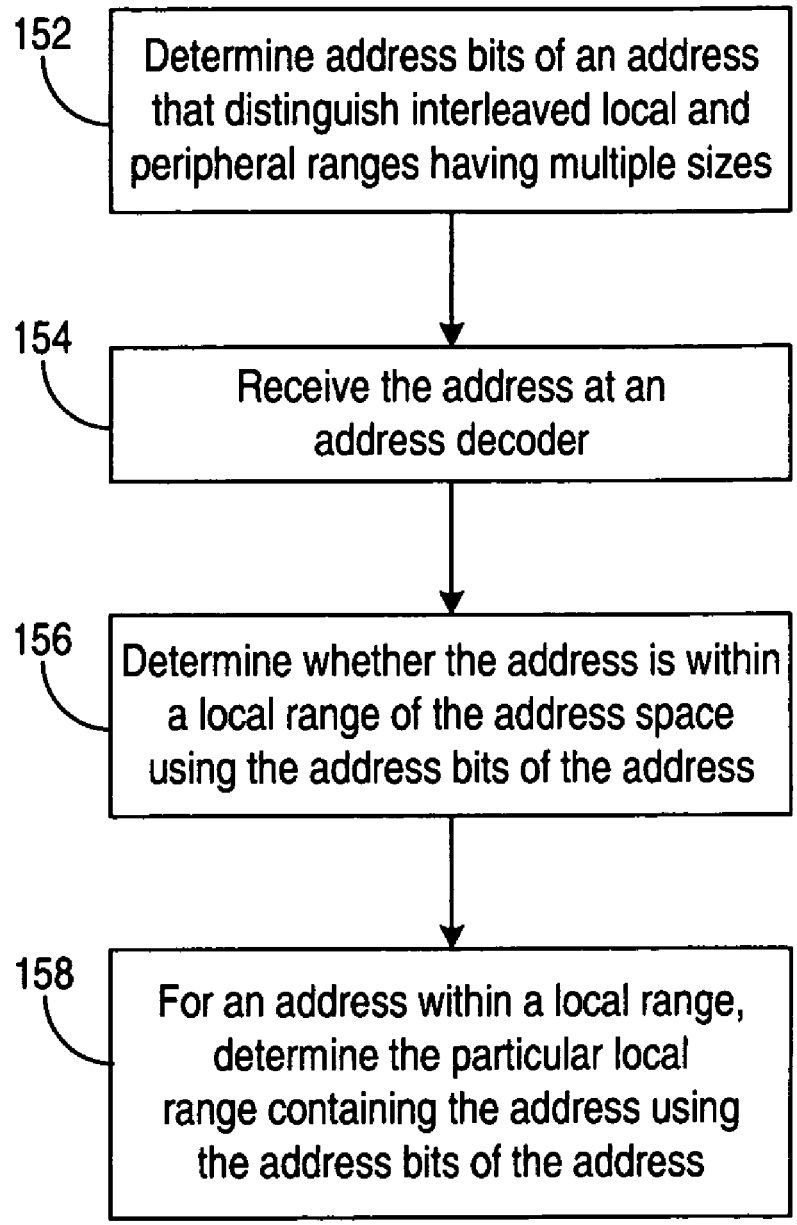
FIG. 2 is a flow diagram of a process for decoding an address in accordance with various embodiments of the invention.

FIG. 2 is a flow diagram of a process for decoding an address in accordance with various embodiments of the invention. An address space may have multiple local ranges and multiple peripheral ranges that may be interleaved and may have various sizes. Each range may have a size that is a power of two and the starting address for the range may also be aligned to that power of two. At step 152, various embodiments of the invention identify specific address bits that are useful for distinguishing the local ranges from the peripheral ranges and for distinguishing the local ranges from each other.

The specific address bits are selected to reduce the number of address bits needed to distinguish the local ranges from the peripheral ranges and to distinguish the local ranges from each other. A partial decoding of the address space may be used to reduce the needed number of address bits. The partial decoding may take advantage of the unallocated regions of the address space to reduce the number of address bits needed to distinguish the local ranges from the peripheral ranges and to distinguish the local ranges from each other. If a processor erroneously issues an address in one of the unallocated regions of the address space, the address decoding may indicate that the address corresponds to one of the local ranges. For a computing system needing to detect erroneous accesses to an unallocated region, additional circuitry may use a more complete decoding of the address space to detect transactions having an address in an unallocated region. This additional circuitry may be allowed to complete the decoding of the address space in longer time period than the one clock cycle required in one embodiment of the address decoding.

An address of a transaction is received at an address decoder at step 154. At step 156, the address decoder determines whether the address is within one of the local ranges of the address space using the specific address bits identified at step 152. In addition at step 158, the address decoder uses the specific address bits to determine the particular local range containing the address, for an address that is determined to be within one of the local ranges at step 156. Identifying the local range containing the address may also identify the local device containing the data element corresponding to the address.

Figure 3:
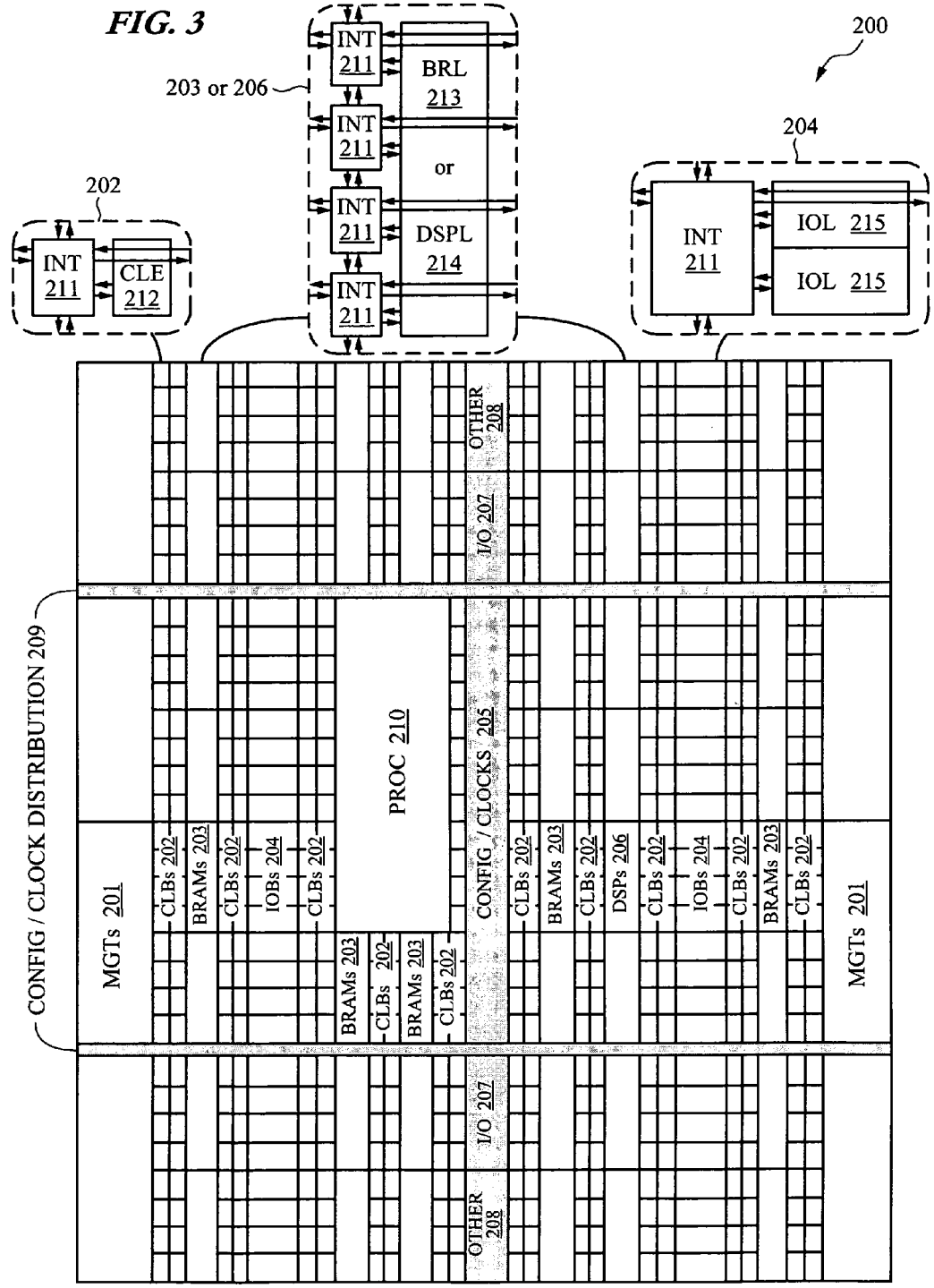
FIG. 3 is a block diagram of a programmable logic device (PLD) that may be used to implement address decoding in accordance with various embodiments of the invention.

FIG. 3 is a block diagram of a programmable logic device (PLD) that may be used to implement address decoding in accordance with various embodiments of the invention. A circuit for decoding an address of an address space may be implemented in the programmable resources of the PLD. A dedicated processor 210 in the PLD or a processor implemented in the programmable resources of the PLD, such as the configurable MicroBlaze processor available from Xilinx, Inc. of San Jose, Calif., may generate the address that is decoded by the address decoder.

PLDs, including FPGAs, may include several different types of programmable resources arranged in an array of programmable tiles. For example, FIG. 3 illustrates an FPGA architecture 200 that includes a large number of different programmable tiles including multi-gigabit transceivers (MGTs 201), configurable logic blocks (CLBs 202), random access memory blocks (BRAMs 203), input/output blocks (IOBs 204), configuration and clocking logic (CONFIG/CLOCKS 205), digital signal processing blocks (DSPs 206), specialized input/output blocks (I/O 207) (e.g., configuration ports and clock ports), and other programmable logic 208 such as digital clock managers, analog-to-digital converters, system monitoring logic, and so forth. Some FPGAs also include one or more dedicated processor blocks (PROC 210).

In some FPGAs, each programmable tile includes a programmable interconnect element (INT 211) having standardized connections to and from a corresponding interconnect element in each adjacent tile. Therefore, the programmable interconnect elements taken together implement the programmable interconnect structure for the illustrated FPGA. The programmable interconnect element (INT 211) also includes the connections to and from the programmable logic element within the same tile, as shown by the examples included at the top of FIG. 3.

For example, a CLB 202 can include a configurable logic element (CLE 212) that can be programmed to implement user logic plus a single programmable interconnect element (INT 211). A BRAM 203 can include a BRAM logic element (BRL 213) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 206 can include a DSP logic element (DSPL 214) in addition to an appropriate number of programmable interconnect elements. An IOB 204 can include, for example, two instances of an input/output logic element (IOL 215) in addition to one instance of the programmable interconnect element (INT 211). As will be clear to those of skill in the art, the actual I/O pads connected, for example, to the I/O logic element 215 are manufactured using metal layered above the various illustrated logic blocks, and typically are not confined to the area of the input/output logic element 215.

In the pictured embodiment, a columnar area near the center of the die (shown shaded in FIG. 3) is used for configuration, clock, and other control logic. Horizontal areas 209 extending from this column are used to distribute the clocks and configuration signals across the breadth of the FPGA.

Some FPGAs utilizing the architecture illustrated in FIG. 3 include additional logic blocks that disrupt the regular columnar structure making up a large part of the FPGA. The additional logic blocks can be programmable blocks and/or dedicated logic. For example, the processor block PROC 210 shown in FIG. 3 spans several columns of CLBs and BRAMs.

Note that FIG. 3 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 3 are purely exemplary. For example, in an actual FPGA more than one adjacent column of CLBs is typically included wherever the CLBs appear, to facilitate the efficient implementation of user logic.

A processor 210 or a processor implemented in the programmable resources of the PLD may have a local bus that is used to access local devices, such as a local memory provided by one or more of BRAMs 203. In addition, a processor may have a peripheral bus that is used to access peripheral devices, such as an I/O device that accesses circuits external to the FPGA architecture 200 using certain of IOBs 204. Each local device may have a corresponding local range in the address space of the processor and each peripheral device may have a corresponding peripheral range in the address space. It will be appreciated that a device may have more than one address range and that multiple devices may share an address range.

Figure 4:
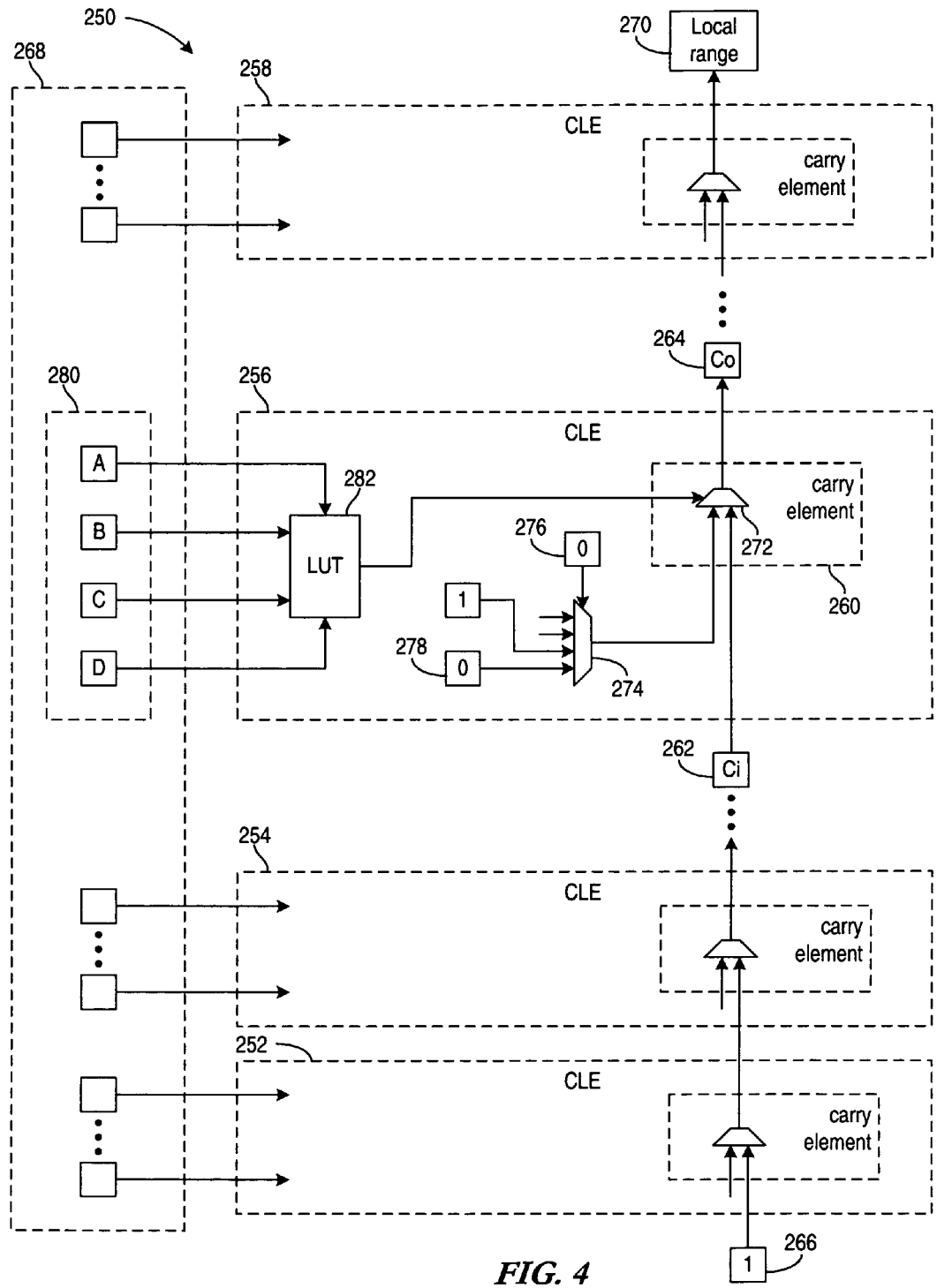
FIG. 4 is a block diagram illustrating usage of configurable logic elements (CLEs) of a PLD to implement an address decoder for a local range using a carry chain in accordance with various embodiments of the invention.

FIG. 4 is a block diagram illustrating usage of configurable logic elements (CLEs) 252, 254, 256, and 258 of a PLD to implement an address decoder 250 for a local range using a carry chain in accordance with various embodiments of the invention. The carry elements 260 each have a respective carry-in 262 and a respective carry-out 264. The carry chain is formed by coupling the carry-out of CLE 252 to the carry-in of CLE 254, coupling the carry-out of CLE 254 to the carry-in 262 of CLE 256, and coupling the carry-out 264 of CLE 256 to the carry-in of CLE 258.

The carry-in of CLE 252 is tied to a constant 266 that may have a value of one. The value of constant 266 may be propagated through the carry chain based on selected decoder address bits 268. The decoder address bits 268 are a subset of the address bits of the address being decoded, and the subset is selected according to certain embodiments of the invention as is later discussed in detail. When the decoder address bits 268 have a value corresponding to a specific local range, the value of constant 266 is propagated through the entire carry chain and is provided at indicator 270 from the carry-out of CLE 258. Otherwise, when the decoder address bits 268 do not have a value corresponding to the specific local range, another value, which may be a value of zero, is provided at indicator 270. Thus, indicator 270 has one value for an address corresponding to a specific one of the local ranges and otherwise indicator 270 has another value. Indicator 270 indicates whether or not the address is within the specific local range.

In one embodiment, each of carry elements 260 has a multiplexer 272. In one embodiment, multiplexer 272 is implemented with pass transistors to provide fast propagation of values from the input to the output of the multiplexer 272. Referring to CLE 256, a first input of the multiplexer 272 is tied to carry-in 262 and a second input of multiplexer 272 is tied to an output of configurable logic 274. The configurable logic 274 of CLE 256 is configured by configuration data 276 of the PLD to provide a value of a constant 278 (with a value different from the value of constant 266) to the second input of multiplexer 272. The multiplexer 272 selects either the value from the carry-in 262 or the value from the constant 278 depending on a control of the multiplexer 272 received from look-up table (LUT) 282. Each CLE 252, 254, 256, and 258 may be similarly configured.

Configurable LUT 282 is configured by configuration data (not shown) to implement a match function that determines whether a subset 280 of the decoder address bits 268 matches a corresponding value for the specific local range. LUT 282 may be configured to implement an AND function with an input for each address bit of the subset 280 that is either the value of the address bit or the inverse of the value of the address bit. When the corresponding LUT 282 for each CLE 252, 254, 256, and 258 indicates a match for a respective subset of the decoder address bits 268, the value of constant 266 is propagated through the carry chain to indicator 270. Otherwise, when the LUT 282 for one more of the CLEs 252, 254, 256, and 258 does not indicate a match, then the value of constant 278 from one of CLEs 252, 254, 256, and 258 is propagated to indicator 270.

In one embodiment, each of the local ranges has a respective address decoder 250 that determines whether an address is within the local range. Each address decoder 250 may have the same decoder address bits 268, but may have different configuration values for LUT 282. Each address decoder 250 may be physically associated with a local device providing the data elements addressed by an address within the local range. For a read transaction from a processor, the indicator 270 may indicate to the processor that data read from the local device is available and valid. For a write transaction from a processor, the indicator 270 may be used as a write enable to write data from the process to the local device.

Figure 5:
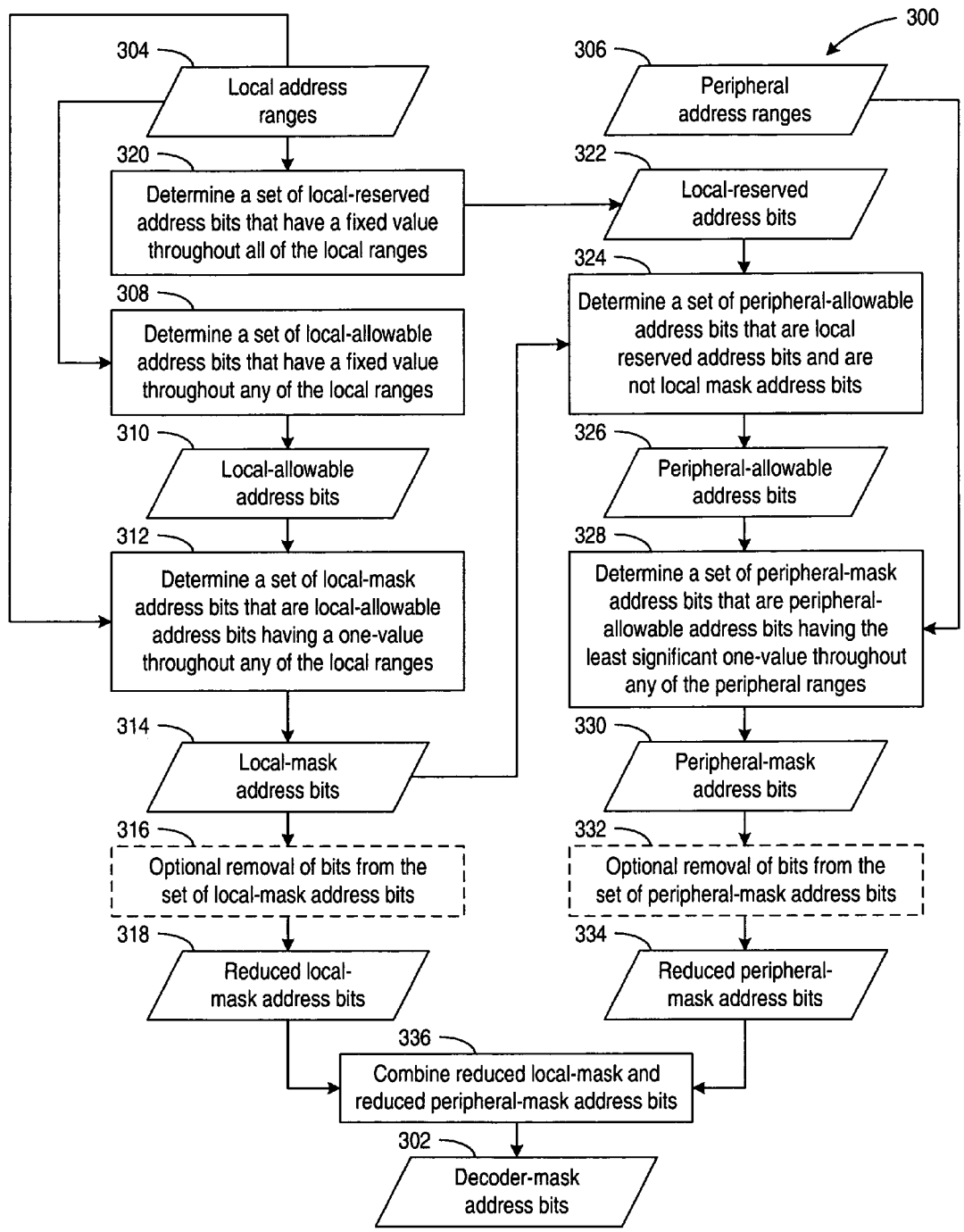
FIG. 5 is a flow diagram of a process for generating a decoder mask in accordance with various embodiments of the invention.

FIG. 5 is a flow diagram of a process 300 for generating a decoder mask 302 in accordance with various embodiments of the invention. The decoder mask 302 is a set of address bits of an address space, and the decoder mask 302 is generated from the local address ranges 304 and the peripheral address ranges 306 of the address space.

Referring to FIG. 1, an example map 104 of an address space includes the four local ranges 106, 108, 110, and 112 and three peripheral ranges 114, 116, and 118. Each of the ranges 106 through 118 may be specified by a starting and an ending address. For example, local range 106 starts at hexadecimal address 0x0000_0000 and ends at hexadecimal address 0x0000_3FFF in an address space with 32-bits of address. An address inclusively between 0x0000_0000 and 0x0000_3FFF is an address in local range 106. For any address in local range 106, the address has a fixed value of 0x0000 for the most significant 16-bits of the address. Thus, each of the most significant 16-bits of the address space has a fixed value of zero throughout local range 106. Each of the ranges 106 through 118 may have a size that is a power of two and the starting address for the range may also be aligned to that power of two. The local and peripheral ranges 106 through 118 may be interleaved and have different sizes.

Process 300 of FIG. 5 may determine the decoder mask 302 specifying address bits of the address space that distinguish the local ranges from each other and that distinguish the local ranges from the peripheral ranges. Process 300 may determine a decoder mask 302 that includes a reduced number of the address bits of the address space by partially decoding the address space. The number of decoder address bits in the decoder mask 302 may be less than the number of the local ranges plus the number of the peripheral ranges. For an address map having peripheral ranges that do not include address zero of the address space, the number of decoder address bits in the decoder mask 302 may be less than the number of local and peripheral ranges minus one.

At step 308, a set 310 of local-allowable address bits is determined. The set 310 of local-allowable address bits are address bits that have a fixed value of either zero or one throughout one or more of the local ranges 304. The set 310 of local-allowable address bits includes address bits that may be useful to distinguish the local ranges 304 from each other. In one embodiment, a set of address bits is represented by a data word having a bit of the data word for each address bit of the address space. When a bit in the data word has a value of one, the corresponding address bit is a member of the set of address bits. Otherwise, the corresponding address bit is not a member of the set. For each of the local ranges 304, a bit-wise exclusive-not-or (XNOR) between the local range's starting and ending addresses generates a respective data word indicating the address bits that have a fixed value in the local range, and a bit-wise OR between these data words for all local ranges 304 generates a data word representing the set 310 of local-allowable address bits. For the example map 104 of FIG. 1, the set 310 of local-allowable address bits may be represented by the data word 0xFFFF_F800.

At step 312, a set 314 of local-mask address bits is determined as the local-allowable address bits that have a fixed value of one throughout one or more of the local ranges 304. For each of the local ranges 304, a bit-wise AND between the local range's starting and ending addresses generates a respective data word indicating the address bits that have a fixed value of one in the local range, and a bit-wise OR between these data words for all local ranges followed by a bit-wise AND with the data word representing the set 310 generates a data word representing the set 314 of local-mask address bits. For the example map 104 of FIG. 1, the set 314 of local-mask address bits may be represented by the data word 0x0200_7000.

At optional step 316, certain bits may be removed from the set 314 of local-mask address bits to generate the reduced set 318 of local-mask address bits. The number of address bits in reduced set 318 may be reduced to between $\log_2 N$ and $N-1$ address bits, where N is the number of local ranges 304. For the example map 104 of FIG. 1 with N=4, the reduced set 318 of local-mask address bits may include between two and three address bits. Because the number of address bits in the set 314 of local-mask address bits is four address bits for the example address map, removal of address bits from set 314 to generate reduced set 318 may be possible.

An example removal algorithm removes each address bit from the set 314 of local-mask address bits that has a fixed value of one throughout all of the local ranges 304, because these address bits are not useful for distinguishing the local ranges 304 from each other. For the example map 104 of FIG. 1, no address bits have a fixed value of one throughout all of the local ranges 304. Thus, reduced set 318 may be identical to set 314 and may be represented by the data word 0x0200_7000.

For each address bit in the set 314 of local-mask address bits, another example removal algorithm counts the local ranges 304 that have a value of one throughout for the address bit. The counts for address bits in the set 314 are compared and the address bit or address bits having the highest count may be removed from the set 314 of local-mask address bits. Alternatively, the address bits having a count that is in a range of counts including the highest count may be removed from the set 314 of local-mask address bits. Address bits may be removed from the set 314 using this approach until the number of address bits remaining in set 318 is N−1 or until removing the next address bit from reduced set 318 would result in a set of address bits that are incapable of distinguishing the local ranges 304 from each other. For the example map 104 of FIG. 1, address bit-25 has a value of one throughout three of local ranges 304 yielding a count of three, address bit-14 has a count of two, address bit-13 has a count of one, and address bit-12 has a count of two. Address bit-25 with the highest count can be removed from set 314 to reduce the number of address bits in reduced set 318 to N−1. The data word representing the reduced set 318 is 0x0000_7000.

For peripheral ranges 306 that include the address of zero of the address space in one of the peripheral ranges 306, step 316 may bypass the removal of an address bit that is otherwise identified to be a candidate for removal. The identified candidates for removal may include every address bit that has a fixed value of one throughout all of the local ranges 304. Without an address bit that has a fixed value of one throughout all of the local ranges 304, determining that an address of zero is allocated to peripheral ranges 306 may not be possible. The removal of a most significant address bit that has a fixed value of one throughout all of the local ranges 304 from the set 314 of local-mask address bits may be bypassed when one of the peripheral ranges 306 includes the address of zero of the address space. Selection of the most significant address bit instead of another address bit that has a fixed value of one throughout all of the local ranges 304 may reduce the extent of the address bits in the set 302 of decoder-mask address bits. A reduced extent of the address bits in set 302 may shorten a carry chain implementation of the address decoder, resulting in faster decoding of an address.

At step 320, a set 322 of local-reserved address bits is determined that includes address bits having a fixed value throughout every one of the local ranges 304. An address bit in the set 322 of local-reserved address bits may have a respective fixed value for each of the local ranges. For each of the local ranges 304, a bit-wise XNOR between the local range's starting and ending addresses generates a respective data word indicating the address bits that have a fixed value in the local range, and a bit-wise AND between these data words for all local ranges 304 generates a data word representing the set 322 of local-reserved address bits. For the example map 104 of FIG. 1, the set 322 of local-reserved address bits may be represented by the data word 0xFFFF_C000.

At step 324, a set 326 of peripheral-allowable address bits is determined that may be useful for distinguishing the local ranges 304 from the peripheral ranges 306. Each address bit in the set 326 of peripheral-allowable address bits is an address bit in the set 322 of local-reserved address bits that is not in the set 314 of local-mask address bits. A bit-wise AND between the data word representing the set 322 of local-reserved address bits with the inverse of the data word representing the set 314 of local-mask address bits generates a data word representing the set 326 of peripheral-allowable address bits. For the example map 104 of FIG. 1, the set 326 of peripheral-allowable address bits may be represented by the data word 0xFDFF_8000.

At step 328, a set 330 of peripheral-mask address bits is determined that includes address bits that may be sufficient to distinguish the local ranges 304 from the peripheral ranges 306. The set 330 includes an address bit for each peripheral range in the peripheral ranges 306 that is the least significant address bit in the set 326 of peripheral-allowable address bits having a fixed value of one throughout the peripheral range. Selection of the least significant address bit instead of another address bit in the set 326 of peripheral-allowable address bits that has a fixed value of one throughout the peripheral range may reduce the extent of the address bits in the set 302 of decoder-mask address bits. A reduced extent of the address bits in set 302 may shorten a carry chain implementation of the address decoder, resulting in faster decoding of an address.

For the example map 104 of FIG. 1, peripheral range 116 may have a set of address bits having a fixed value of one throughout peripheral range 116 represented by a data word with hexadecimal value 0x0009_0000 obtained by a bit-wise AND between the starting and ending address of peripheral range 116. Selection of the least significant bit in this set may be represented by the data word 0x0001_0000. A bit-wise OR between this data word and a similarly generated data word for each of the other peripheral ranges 114 and 118 may result in the set 330 of peripheral-mask address bits represented by the data word 0x0019_0000.

At optional step 332, certain bits may be removed from the set 330 of peripheral-mask address bits to generate the reduced set 334 of peripheral-mask address bits. The number of address bits in reduced set 334 may be reduced to between 1 and M−1 address bits, where M is the number of peripheral ranges 306. For the example map 104 of FIG. 1 with M=3, the reduced set 334 of peripheral-mask address bits may include between one and two address bits. Because the number of address bits in the set 330 of peripheral-mask address bits is three address bits for the example address map, removal of address bits from set 330 to generate reduced set 334 may be possible.

For each of peripheral ranges 306, a most significant address bit in the set 330 of peripheral-mask address bits that has a fixed value of one throughout the peripheral range is included in the reduced set 334 of peripheral-mask address bits. Step 332 may replace the set 330 of peripheral-mask address bits with the reduced set 334 of peripheral-mask address bits. Selection of the most significant address bit instead of another address bit in the set 330 of peripheral-mask address bits that has a fixed value of one throughout the peripheral range may reduce the extent of the address bits in the set 302 of decoder-mask address bits. A reduced extent of the address bits in set 302 may shorten a carry chain implementation of the address decoder, resulting in faster decoding of an address.

For the example map 104 of FIG. 1, a set of address bits that are in the set 330 and have a fixed value of one throughout peripheral range 116 may represented by a data word with hexadecimal value 0x0009_0000. This data word may be obtained by a bit-wise AND between the starting and ending address of peripheral range 116 followed by another bit-wise AND with the data word representing the set 330 of peripheral-mask address bits. Selection of the most significant address bit of this data word results in a data word 0x0008_0000 that represents the most significant bit in the set 330 that has a fixed value of one throughout the peripheral range 116. A bit-wise OR between this data word and a similarly generated data word for each of the other peripheral ranges 114 and 118 may result in the reduced set 334 of peripheral-mask address bits represented by the data word 0x0018_0000.

At step 336, the union of the reduced set 318 of local-mask address bits and the reduced set 334 of peripheral-mask address bits generates the decoder-mask address bits 302. An address decoder may receive address bits of an input address that are included in the set 302 of decoder-mask address bits. The address decoder may check that the decoder address bits in the set 302 of decoder-mask address bit match a particular value for one of the local ranges 304. For the example map 104 of FIG. 1, a bit-wise OR of the data word 0x0200_7000 representing the reduced set 318 of local-mask address bits and the data word 0x0018_0000 representing the reduced set 334 of peripheral-mask address bits generates the data word 0x0218_7000 representing the set 302 of decoder mask address bits. Thus, an address decoder for one of local ranges 304 may decode an input address using the decoder address bits 25, 20, 19, 14, 13, and 12 in set 302 of decoder-mask address bits. That is, advantageously, only 6 bits are used to decode an input address.

Process 300 may automatically generate the decoder address bits from the local ranges 304 and the peripheral ranges 306, allowing a fast address decoder to be automatically generated. In addition, any modification of the map of the address space may cause the address decoder to be automatically regenerated, which may be especially useful when the address decoder is implemented on a PLD.

Figure 6:
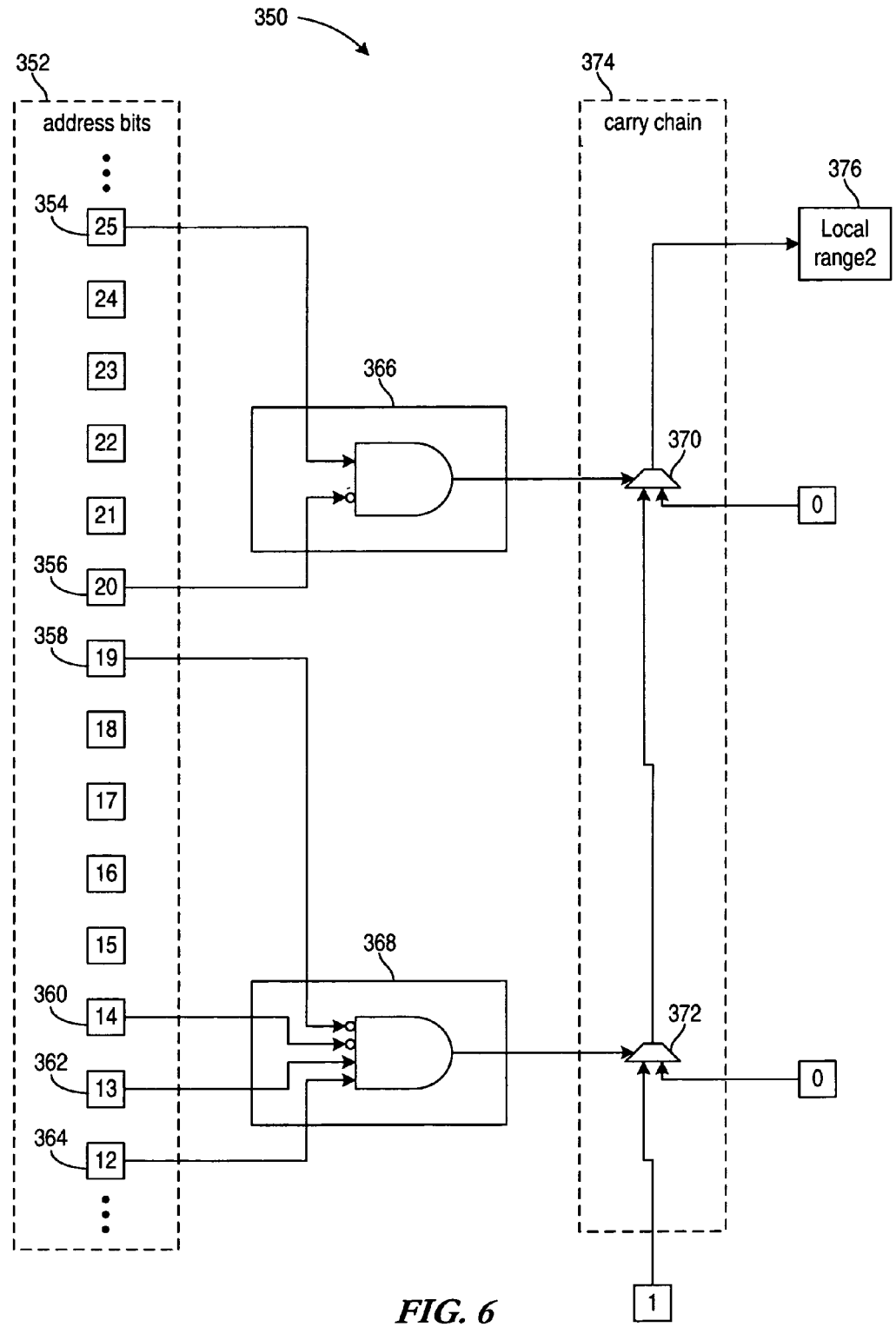
FIG. 6 is a block diagram of an address decoder in accordance with various embodiments of the invention.

FIG. 6 is a block diagram of an address decoder 350 in accordance with various embodiments of the invention. The address decoder 350 may decode whether an input address 352 is within local range 108 of FIG. 1 for an address space having map 104. The address decoder 350 may use decoder address bits 354 through 364 to determine whether input address 352 is within local range 108 of FIG. 1. Decoder address bits 354 through 364 may be selected in the process 300 of FIG. 5 for the local and peripheral ranges of the address space. A total number of the decoder address bits 354 through 364 may be less the number of the local and peripheral ranges. For peripheral ranges that do not include address zero of the address space, a total number of the decoder address bits 354 through 364 may be less the number of the local and peripheral ranges minus one.

Match circuit 366 may receive a subset 354 and 356 of the decoder address bits and match circuit 368 may receive a subset 358 through 364 of the decoder address bits. Each match circuit 366 and 368 may be a LUT of a PLD and output a control signal to carry elements 370 and 372, respectively. Each match circuit may check whether the respective subset of the decoder address bits 354 through 364 matches a respective value corresponding to local range 108 of FIG. 1. For example, local range 108 of FIG. 1 has a value of one for decoder address bit 354 and a value of zero for decoder address bit 356, and match circuit 366 outputs an asserted control signal to carry element 370 when the subset 354 and 356 of decoder address bits 354 through 364 matches these values.

Carry chain 374 may include carry elements 370 and 372. Carry chain 374 may output an indicator 376 that indicates whether input address 352 is in a portion of the address space that includes local range 108 of FIG. 1 and does not include any of the other local and peripheral ranges 106, 110, 112, 114, 116, and 118. Because of the partial decoding of the address space, this portion of the address space that include local range 108 may also include some of the unallocated regions 120 of FIG. 1.

Figure 7:
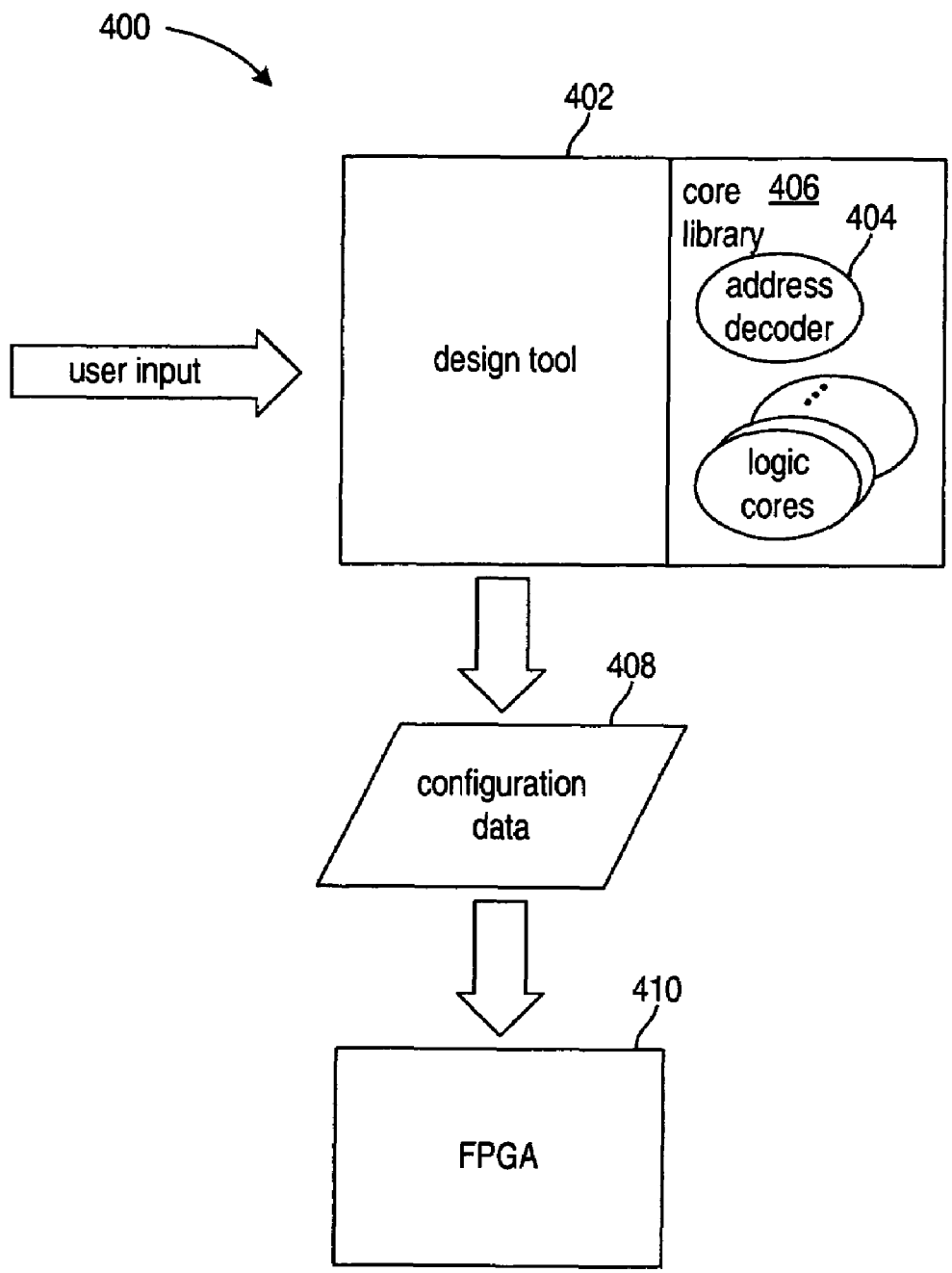
FIG. 7 is a block diagram an example FPGA arrangement using an address decoder in accordance with various embodiments of the invention.

FIG. 7 illustrates an example arrangement 400 in which an address decoder having the characteristics and capabilities described herein may be implemented on an FPGA such as the example FPGA of FIG. 3. Those skilled in the art will recognize that an electronic design tool 402 (or set of tools), such as the System Generator tool from Xilinx, may make a parameterizable logic core available to a designer. The logic core is available to a designer for combining with other logic of a design, and the designer may specify parameter values that are suitable for the particular application.

In one embodiment, the address decoder logic core 404 is one of many logic cores available in a core library 406 that is accessible to a user via the design tool. The design tool also provides the capability to generate configuration data 408 from the assembled logic cores and other design objects. The configuration data may then be loaded into the FPGA 410 to implement a circuit having the address decoder described herein. Those skilled in the art will recognize that the address decoder logic core, either alone, or in combination with the executable instructions of a design tool(s) for implementing the address decoder, may be provided via a variety of computer-readable media or delivery channels such as magnetic or optical disks or tapes, electronic storage devices, or downloaded over a network. In addition, various alternative computing arrangements, including one or more processors and a memory arrangement configured with program code, would be suitable for hosting the design tool.

The present invention is thought to be applicable to a variety of systems for decoding addresses. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for decoding an address in an address space including a plurality of local ranges and a plurality of peripheral ranges, wherein the plurality of local ranges are associated with a plurality of local memory devices coupled to a local bus and the plurality of peripheral ranges are associated with a plurality of peripheral devices coupled to a peripheral bus, the method comprising:

determining decoder address bits of the address space that distinguish the local ranges from each other and that distinguish the local ranges from the peripheral ranges, wherein the local and peripheral ranges are interleaved and have a plurality of sizes, and a number of the decoder address bits is less than a number of address bits in the address space and less than a quantity that is a number of the local ranges plus a number of the peripheral ranges;

issuing a first transaction with an input address on the local bus and simultaneously issuing a second transaction with the input address on the peripheral bus;

determining, in response to the decoder address bits of the input address, whether the input address is within a portion of the address space that includes one of the local ranges and does not include any of the peripheral ranges and any of the local ranges other than the one of the local ranges; and aborting processing of the transaction by the plurality of peripheral devices in response to the determining that the input address is within a portion of the address space that includes the one of the local ranges and does not include any of the peripheral ranges.

2. The method of claim 1, wherein determining decoder address bits includes:

determining a set of local-mask address bits, each address bit in the set having a fixed value of one throughout one or more of the local ranges;

determining a set of peripheral-allowable address bits, each address bit in the set having a fixed value throughout every one of the local ranges and not included in the set of local-mask address bits;

determining a set of peripheral-mask address bits that includes, for each peripheral range, a least significant address bit in the set of peripheral-allowable address bits that has a fixed value of one throughout the peripheral range; and determining a set of the decoder address bits that includes each address bit in the set of local-mask address bits and each address bit in the set of peripheral-mask address bits.

3. The method of claim 2, wherein an address bit in the set of peripheral-allowable address bits has a respective fixed value for each of the local ranges.

4. The method of claim 2, further comprising removing each address bit from the set of local-mask address bits that has a fixed value of one throughout all of the local ranges.

5. The method of claim 4, further comprising bypassing the removing of a most significant address bit from the set of local-mask address bits that has a fixed value of one throughout all of the local ranges in response to one of the peripheral ranges including an address of zero of the address space.

6. The method of claim 2, further comprising, for each address bit in the set of local-mask address bits, counting a count of the local ranges that have a value of one for the address bit throughout, and removing at least one address bit having the count that is highest from the set of local-mask address bits.

7. The method of claim 6, wherein the removing further removes address bits from the set of local-mask address bits having a respective count that is in a range inclusively between the count that is the highest and another count.

8. The method of claim 7, further comprising bypassing the removing of a most significant address bit from the set of local-mask address bits having the respective count that is in the range in response to one of the peripheral ranges including the address of zero of the address space.

9. The method of claim 6, wherein a number of address bits in the set of local-mask address bits after the removal is less than a quantity that is the number of the local ranges.

10. The method of claim 6, further comprising bypassing the removing of a most significant address bit from the set of local-mask address bits having the count that is highest in response to one of the peripheral ranges including the address of zero of the address space.

11. The method of claim 2, further comprising replacing the set of peripheral-mask address bits with an alternative set of peripheral-mask address bits that includes, for each peripheral range, a most significant address bit in the set of peripheral-mask address bits that has a fixed value of one throughout the peripheral range.

12. The method of claim 2, wherein determining the set of peripheral-allowable address bits, includes:
   determining a set of local-reserved address bits, each address bit in the set having a fixed value throughout every one of the local ranges; and
   determining the set of peripheral-allowable address bits that includes each address bit in the set of local-reserved address bits that is not in the set of local-mask address bits.

13. The method of claim 2, wherein each local range and each peripheral range have a size that is a power of two and is aligned in the address space to the power of two.

14. The method of claim 2, wherein the set of local-mask address bits, the set of peripheral-allowable address bits, the set of peripheral-mask address bits, and the set of decoder address bits are each represented by a word of data having a corresponding bit of the data for each address bit of the address space.

* * * * *